Figure 1:
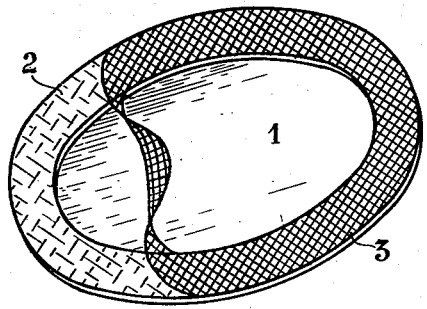

Dec. 15, 1942.  Z. MARTOS  2,305,453

MEMBRANES MADE OF RUBBER OR THE LIKE

Filed March 12, 1940

Inventor,
Z. Martos
By Glascock Downing & Seebold
Attys.

Patented Dec. 15, 1942

2,305,453

UNITED STATES PATENT OFFICE 2,305,453

MEMBRANES MADE OF RUBBER OR THE LIKE

Zoltán Martos, Budapest, Hungary; vested in the Alien Property Custodian

Application March 12, 1940, Serial No. 323,633
In Hungary March 30, 1939

1 Claim. (Cl. 128—294)

This invention relates to flat or otherwise shaped membranes made of rubber or other similarly elastic and impermeable material, which are to be fixed for a certain time in their working position by means of an adhesive. The device according to the invention may be called a universal membrane because its material as well as its shape and outfit enable it to serve a great many purposes and satisfy the most varied requirements.

On the one hand a great deal of similar membranes have been proposed without being able to be brought into trade, because the adhesive fixing them in position has not been prepared in a manner serving their purpose. The invention gives also the possibility of an expedient preparation of the adhesives best suited for the said membranes, namely soft rubber solutions, the surface of which shrinks in the air into a thin film but which under the protection of this film retain their adhesiveness for months and even for years in their original strength.

On the other hand it is a known method to cover adhesive surfaces with tulle or other removable coatings. These coatings have covered the entire adhesive surfaces or long strips and have to be cut out for use with scissors. The invention makes use of such coatings and shapes them so as to be combined with the said membranes without resorting to foreign expedients.

The object of the invention is to secure the durability and reliability of the fixation by the adhesive rim and to enable the membranes to support safely transport and storage indiscriminately whether they are thick or extremely thin.

Another object of the invention is to shape membranes as receptacles of varying size, furthermore to enable them to be equipped with different fittings and among other things to adapt them to meeting hygienic requirements.

Other particulars of the invention will be fully set forth in the following description made in connection with the accompanying drawing.

The chief characteristic of the invention is that the said membrane proper is rimmed by an adhesive border covered with tulle or some other coating intended for removal. In this way under the membrane a securely closed inner space will be obtained all around and yet accessible to different purposes. This method avoids the disadvantages of the already known similar membranes either using some foreign adhesive which it has been troublesome to bring from without and the laying on of which has been imperfect, or needing first being moistened to become adhesive which, however, has never been accomplished in a uniform manner, but usually so that the adhesive being previously in dry state on the membranes has been locally washed out and rubbed off.

The problem of adhesion of similar already known membranes cannot be considered as solved, the less so as their adhesive rims have had to be rubbed off with the fingers, on using them. This has the disadvantage, beside the drawbacks already mentioned above, of not being hygienical and of soiling the hand. A further grave disadvantage of this method is that to pass the fingers over the layer of adhesive is to reduce considerably, even to destroy the adhesiveness of a rubber solution or the like.

The adhesive rim covered with a removable tulle or other coating avoids these drawbacks and allows the application of rubber solutions and other soft adhesives even in fairly thick layers. It presents, when covered with tulle or other coating, dry outer surfaces which will not stick either to each other or to any other object, and may be stored under the most unfavourable climatic circumstances during many months and even years. Furthermore, the adhesive rims of this kind will be able to stand all the stresses connected with the usual packing, transport and storage without showing any traces of such handling as they are not brittle at all. When putting it to use the membrane according to the invention does not require any foreign means or any foreign material or the performance of any special auxiliary operation. All that has to be done is to remove the tulle or other coating, which can be performed simply by hand and instantaneously, this in a uniform manner over the whole annular surface of the adhesive rim, without damage done to the layer of adhesive.

The joint effect of the annular form of the adhesive rim and of the fact that the layer of adhesive devoid of its coating behaves as a plastic mass will secure a practically tightly closing adhesion of the border. The plasticity of the adhesive layer will make it possible to add to the adhesive certain known filling materials or more properly speaking known accessory agents by which the capacity of adhesion and the viscosity of the said adhesive will be regulated in such a manner as to ensure that the adhesive border should adhere with sufficient strength but that it should nevertheless be possible to remove it easily and smoothly. The necessary amount of adhesion can also be ensured by the proper selection of the width of the adhesive border.

The tulle or the like subdivides the surface of the adhesive layer into meshes of a net which facilitates the adhering of the membrane and its lifting.

Another and not less essential characteristic of the invention is that the membrane is along its adhesive border reinforced either on its inner or on its outer side or on both, by a likewise flat or otherwise shaped rim of flat or other shape also made of rubber or of some similarly resilient and impermeable material which rim is stuck or fixed in some other manner to the membrane. This arrangement increases the advantages already indicated by the fact that it will enable even membranes as thin as a film to be employed, which may now be stuck-on efficiently all around their periphery by means of their border, whilst subsequently they can be peeled off without any danger, because it is exactly at the place where they have to stand the greatest mechanical stresses that they will possess the highest amount of mechanical resistance and therefore it is exactly in these places that there is the least probability of their being torn. The reinforcing border referred to will also enable the membrane to cling with the necessary fastness to the places in question on which it is to be stuck, as the reinforcing rim is made of a material identical with, or at least akin to, the one of which the membrane proper is made.

A few embodiments of the new type of membranes are represented diagrammatically by the drawing. Figs. 1 to 5 represent membranes of a circular and more or less flat shape, viz., Fig. 1 represents a perspective view of a membrane taken from the adhesive side, whilst Figs. 2 to 5 represent other membranes in diametral sections. Figs. 6 to 10 represent embodiments in which the membrane proper is in shape of a utricle or a pileus, that is the shape of a collecting receptacle, whilst its adhesive border is conical. Fig. 7 is a side elevation, whilst Figs. 6 and 8–10 are vertical sections.

According to Fig. 1 the membrane is a flat circular disc 1 made of rubber, the border 2 of which, coated all around its periphery with some suitable adhesive material, preferably rubber solution, is covered by the network fabric 3 of similarly annular shape. This figure shows how the network fabric 3 has to be torn up and peeled off when putting the membrane to use without having to touch the adhesive layer proper.

The membrane shown in the drawing closes the place which it covers in the same way as if its entire inner surface were coated with adhesive material, whereas the area within the surrounding adhesive rim 2 is left loose with a free inner space. If for example a local medical wound dressing is covered with this kind of membrane, the desired closure is perfect without the dressing itself being influenced by the adhesive. If, afterwards, the membrane is lifted, its removal will not cause the wound dressing to be torn up, and it will be possible to inspect, remove and renew the said dressing freely. If necessary it will also be possible to cut up the new membrane without endangering the dressing. In this case a free inner space is disposable under the membrane.

The disc 1 forming the main body of the membrane in the embodiments according to Figs. 2-5 is fitted with border reinforcements 4 and 5, as well as with the local reinforcement 6 of any desired shape situated inside the adhesive border. The border reinforcements 4 and 5, respectively, serve for facilitating the handling of the membrane, whilst the reinforcement 6 has to exert local pressure, as may be required in a given case and very useful for the better fixation of some wound dressing, or in cosmetics for smoothing out wrinkles.

Figure 3:
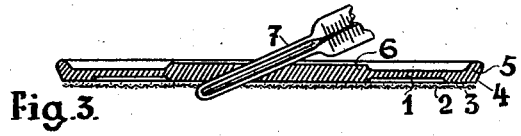
Figure 4:
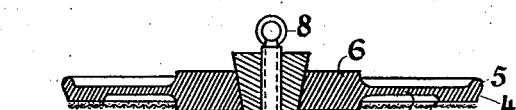
Figure 5:
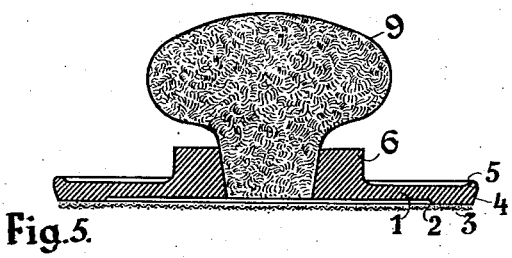

According to Figs. 3 to 5 the local reinforcements 6 are perforated by an adjusting hole. According to Fig. 3, a thermometer 7 may be placed into such a hole, thus enabling the temperature of some defined place of the human or animal body to be ascertained accurately.

According to Fig. 4 it is the sampler 8, and according to Fig. 5 the air filter 9 that is inserted into the adjusting hole. A membrane of this last-named type may also serve as a substitute for a gas mask.

It is also possible to make direct use of the membranes described for numerous industrial purposes of a wide range.

According to Figs. 6 to 10, the membrane proper is in shape of a utricle or a pileus, so that it may be employed for instance for collecting purulent matter or some other secretion, or any other liquid, for instance a trickling liquid in industry. Furthermore it may be employed as a finger-case for spinners, weavers, physicians, etc. as well as by way of a protecting coating for breast nipples or for cows' udders, etc., etc.

Figure 6:
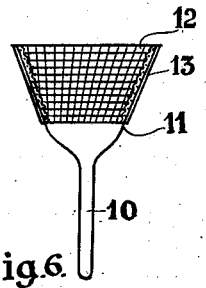
Figure 2:
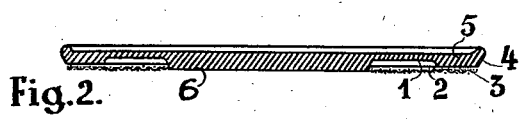
Figure 7:
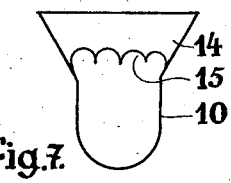
Figures 9, 10:
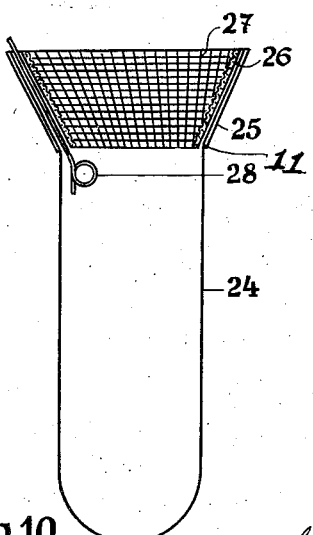

As appears from Figs. 6 and 9 the thin walled pileus 10 can be folded flat, whereby packing is facilitated and which arrangement offers moreover the advantage of rendering the slow and gradual filling of the pileus possible in a safe manner, also when the said pileus in use is fixed and therefore air-tightly closed by means of its adhesive border, without any special provision having to be made for the removal of quantities of air trapped.

According to Fig. 6, the inside of the adhesive border 11 is rimmed by the belt of network fabric 12, whilst its outside is rimmed by the reinforced belt 13. Although for the sake of greater clarity the adhesive border is shown as being of conical shape, there is, nevertheless, nothing to prevent this border also being folded flat in the same way as the pileus 10 forming the membrane proper.

According to Fig. 7 the external border of the pileus 10 is surrounded by an external reinforcing rim 14, the lower margin 15 of which is scalloped. Scalloping renders the transition between the reinforced border and the unreinforced main body of the pileus 10 smooth, so that the pileus may in a given case even be as thin as a film. Moreover, the scalloping may act as a cut-out in the place of transition and may facilitate the fixation by adhesion as well as the lifting of the membrane border. Similar advantages will result from scalloping the other margin of the reinforcing rim 14 also.

Figure 8:
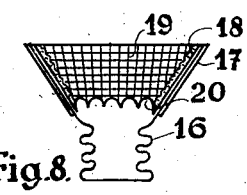

According to Fig. 8 the pileus 16 forming the membrane proper is folded so as to enable it to be drawn out in the manner of an accordion. This will enable the initial airlessness of the interior of the membrane to be carried very far. For the same purpose the membrane may also be rolled up. The adhesive border 11 will in this case have belt-shaped reinforcing rims 17 and 18 respectively outside as well as inside and further it will have, inside, a tulle covering 19 the lower margins 20 of all of which are scalloped.

According to Fig. 9 the adhesive border 11 of the pileus 21 is gripped by the sheets folded doubly on each other of one and the same reinforcing rim 22, which sheets, all of one piece, accordingly pass from the outside to the inside. The internal sheet is covered with the tulle coating 23. It is an advantage of this embodiment, that after lifting the external sheet of the reinforcing rim 22 the border of the pileus 21 can likewise be lifted and removed, and in case of necessity it is also possible to exchange the whole pileus without endangering the contents which have collected in it. During this operation it is practically only such parts of the membrane that have to be touched as have previously been isolated from the contents of the pileus. A disinfecting or other preparation may also be concealed between the sheets of the reinforcing rim 22. The adhesive rim 11 may of course in this case also be fitted with a reinforcing rim fixed to it permanently.

Fig. 10 represents a pileus 24 of greater size than the others which is provided on its adhesive border 11 outside and inside with the reinforcing rims 25, 26 respectively, and inside with the tulle covering 27. The adhesive border of the membrane is perforated by the small tube 28 made of rubber or of some other elastic material, one end of which tube hangs freely into the interior of the membrane. It is also possible to employ several tubes. These tubes will, on the one hand, effect the evacuation of the air on the occasion of the rapid filling of the peaked cap 24, whilst on the other hand they will function as automatic closing members for a few minutes when they collapse somewhere in consequence of the rising level of liquid. Membranes of this kind may be used for instance as collectors of urine.

What I claim is:

A device of the character described comprising a cap-shaped membrane having a conical border, an adhesive layer of rubber solution on said border, a covering of tulle-like fabric on said coating, and a reinforcing rim on the border of the membrane provided with an inner scalloped margin.

ZOLTÁN MARTOS.